(12) United States Patent
Bruck et al.

(10) Patent No.: US 6,502,903 B2
(45) Date of Patent: Jan. 7, 2003

(54) SEAT INTEGRATED LATCH RECLINER ASSEMBLY WITH INERTIAL LOCKING MECHANISM

(75) Inventors: Stephen C. Bruck, Fraser, MI (US); Tyrone Secord, Troy, MI (US)

(73) Assignee: BAE Industries, Inc., Centerline, MI (US)

( * ) Notice: Subject to any disclaimer, the term of this patent is extended or adjusted under 35 U.S.C. 154(b) by 45 days.

(21) Appl. No.: 09/758,780

(22) Filed: Jan. 11, 2001

(65) Prior Publication Data

US 2002/0089224 A1 Jul. 11, 2002

(51) Int. Cl.$^7$ ................................................. B60N 2/02
(52) U.S. Cl. ............................. 297/378.11; 297/378.12
(58) Field of Search ....................... 297/378.11, 378.12, 297/378.14, 216.1, 216.13, 216.14

(56) References Cited

U.S. PATENT DOCUMENTS

| | | | |
|---|---|---|---|
| 4,082,353 A | 4/1978 | Hollowell | |
| 4,103,970 A | 8/1978 | Homier | |
| 4,225,177 A | 9/1980 | Kluting | |
| 4,366,984 A | 1/1983 | Klueting et al. | |
| 4,438,974 A * | 3/1984 | Kresky et al. | 297/378.11 |
| 4,747,641 A * | 5/1988 | Bell | 297/378.14 X |
| 5,163,735 A | 11/1992 | Aljundi | |
| 5,265,937 A | 11/1993 | Allen | |
| 5,328,241 A | 7/1994 | Haider | |
| 5,460,429 A | 10/1995 | Whalen | |
| 5,522,643 A * | 6/1996 | Matsuura | 297/378.12 X |
| 5,556,159 A | 9/1996 | Canteleux | |
| 5,842,744 A | 12/1998 | Harmon | |
| 5,882,080 A * | 3/1999 | Houghtaling et al. | 297/378.11 |
| 5,961,183 A | 10/1999 | Smith et al. | |
| 6,019,430 A | 2/2000 | Magyar et al. | |
| 6,209,955 B1 * | 4/2001 | Seibold | 297/378.12 X |
| 6,345,867 B1 * | 2/2002 | Hellrung et al. | 297/378.12 X |

\* cited by examiner

Primary Examiner—Peter M. Cuomo
Assistant Examiner—Stephen Vu
(74) Attorney, Agent, or Firm—Gifford, Krass, Groh, Sprinkle, Anderson & Citkowski, P.C.

(57) ABSTRACT

A latch assembly for a seat back including a lower support bracket and an upwardly extending arm. A latch gear, mounted to the arm at the hinged connection, includes a first plurality of teeth. First and second cams pivotally secure to the support bracket and are operable to rotate in opposite directions. A pawl is engageable by one or both of the cams and includes additional teeth arrayed in opposing fashion to those of the latch gear. The pawl has an extending end configuration defined by an upwardly/arcuately extending surface. A wedge block includes shoulder support surfaces, the pawl engaging a first surface upon being rotated between latched and disengaged positions. In response to an inertial load, the pawl shifts in a lateral direction to engage upon a second shoulder support surface, the plurality of teeth being forcibly interengaged against those of the latch gear.

13 Claims, 3 Drawing Sheets

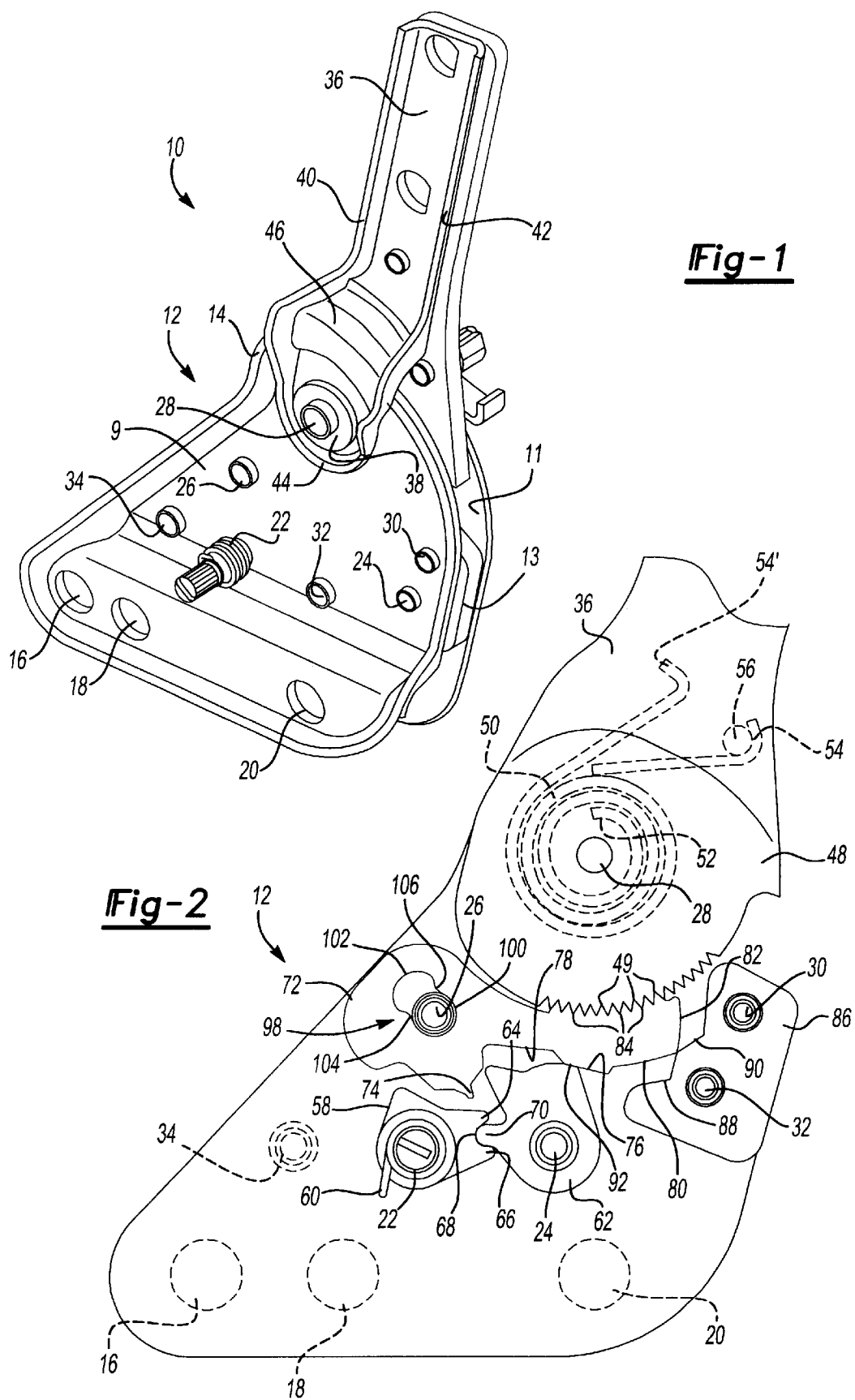

SEAT INTEGRATED LATCH RECLINER ASSEMBLY WITH INERTIAL LOCKING MECHANISM

BACKGROUND OF THE INVENTION

1. Field of the Invention

The present invention relates generally to seat integrated recliner latch assemblies and, more particularly, to an improved recliner latch assembly incorporating a radially shiftable and yielding pawl in combination with a fixedly positioned wedge block for creating an upward force on the pawl so as to maintain a toothed engagement with a rotatable seatback.

2. Description of the Prior Art

The prior art is well documented with examples of vehicle seat recliner mechanisms and, in particular, those which employ some form of inertial locking or restraining mechanism responsive to a determined force exertion and for the purpose of maintaining the seat back in an upright locked position. U.S. Pat. No. 5,163,735, issued to Aljundi, discloses an inertia latch for a vehicle seat backrest which includes a wheel having a pinion gear formed thereon and which engages sector plate teeth of a backrest bracket portion. As the backrest is shifted on rapid deceleration, the wheel rapidly drives a locking tooth into engagement with a locking pawl at the lower end of the inertia pendulum. The inertia pendulum is rotated upon application of an inertial load into an interlocking relationship with the locking tooth. A tilt control pinion gear engages a tilt sector plate to adjust the orientation of the seat back relative to the seat bottom.

U.S. Pat. No. 4,082,353, issued to Hollowell, teaches another variation of an inertia-responsive vehicle seat back latch mechanism for a vehicle seat assembly and including a seat back pivotally supported for forwardly tilting movement. The latch mechanism includes a seat back stud movable with the seat back, a locking pawl pivotally attached to the seat cushion support which is adapted to engage the seat back stud, and a latching pawl pivotally attached to the seat cushion support for preventing rotation of the locking pawl. The locking pawl is disposed to engage the seat back stud, but is cammable free of the seat back stud thereby allowing forward tilting of the seat back. During a vehicle deceleration greater than a predetermined value, the latching pawl prevents rotation of the locking pawl by engaging the locking pawl with the seat back and preventing forward tilting of the seat back.

Additional examples of vehicle seat back inertial locking devices are illustrated by U.S. Pat. No. 5,460,429, issued to Whalen, and U.S. Pat. No. 4,225,177, issued to Klutting. U.S. Pat. No. 5,328,241, issued to Haider, teaches a recliner for a vehicle seat assembly in which the locking pawl of the recliner is formed with teeth configured to resist damage when the seat back is rotated to a forward dump position. The pawl teeth are disclosed as being progressively longer, from the end of the pawl inward, over a selected number of teeth and so that the teeth resist bending deformation caused by impact with the latch gear end face.

SUMMARY OF THE PRESENT INVENTION

The present invention is a novel seat integrated restraint latch assembly with built-in inertial locking mechanism for maintaining a seat back of the seat in an upright position responsive to an experienced inertial load (also referenced as a "crash load"). Applicant further believes the design of the instant invention to set a new industry standard of load capability for a belted seat back latch/recliner mechanism.

A frame includes a lower support bracket secured to a floor of the vehicle and an upwardly extending arm hingedly connected to the support bracket and defining part of a seat back of the vehicle seat. The extending arm is preferably reinforced proximate the hinged connection and so that, upon experiencing the inertial load, engages against and extending flange of the support bracket to prevent the arm from bending. A spring biased latch gear is mounted to the arm at the hinged connection and includes an exterior facing surface defined, in part, by a first plurality of teeth.

A first cam is actuated by a lever projecting from a side of the lower support bracket of the seat frame. The first cam is pivotally secured to the support bracket at a first specified location and is spring biased in a selected rotation direction. A second cam is likewise pivotally secured to the support bracket at a second location. The first and second cams are configured with associated recessed and extending finger portions such that, upon actuation and rotation of the first cam in a given direction, the second cam is influenced to rotate in an opposite direction.

A pawl is pivotally secured to the support bracket at a third location and is engageable by one or both of the first and second cams. The pawl includes a second plurality of teeth arrayed in opposing fashion relative to the first plurality of teeth of the latch gear. The pawl further includes an extending end configuration further defined by an upwardly and arcuately extending surface.

A wedge block is fixedly secured to the support bracket at a fourth location. The wedge block includes, in the preferred variant, first and second shoulder support shoulder support surfaces which are configured in a stepped arrangement in opposing fashion to the extending end configuration of the pawl. The extending end configuration of the pawl engages upon the first support surface of the wedge block upon being rotated from a first latched position to a second disengaged position and at which point the seat back may be rotationally readjusted relative to the support bracket and seat bottom.

An elongated interior channel is defined within the pawl and includes a first substantially circular shaped section and a second substantially circular shaped section communicating with the first circular section by a narrowed boundary disposed therebetween. A fixed pin projects from the support bracket and through a first selected section of the interior channel. The pin radially and forcibly shifts across the narrowed boundary responsive to the experienced inertial (or crash) load and shifts the pawl in a lateral direction so that the extending end configuration engages upon the second and succeeding shoulder support surface. At this point, the second arrayed plurality of teeth of pawl are forcibly pressed into inter-engaging contact against the first plurality of teeth of the latch gear. Additional upward engagement against the pawl is further contributed by the first and second cams in the deformed and inertial loaded position.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an elevational view of the components of the seat frame, including the lower support bracket and the upwardly extending and rotatably associated arm forming a portion of the vehicle seat back;

FIG. 2 is a first plan view of the latch gear, first and second cams, laterally shiftable pawl and fixed wedge block mounted upon the frame components and illustrated in a first latched position;

DETAILED DESCRIPTION OF THE PREFERRED EMBODIMENT

Figure 3:
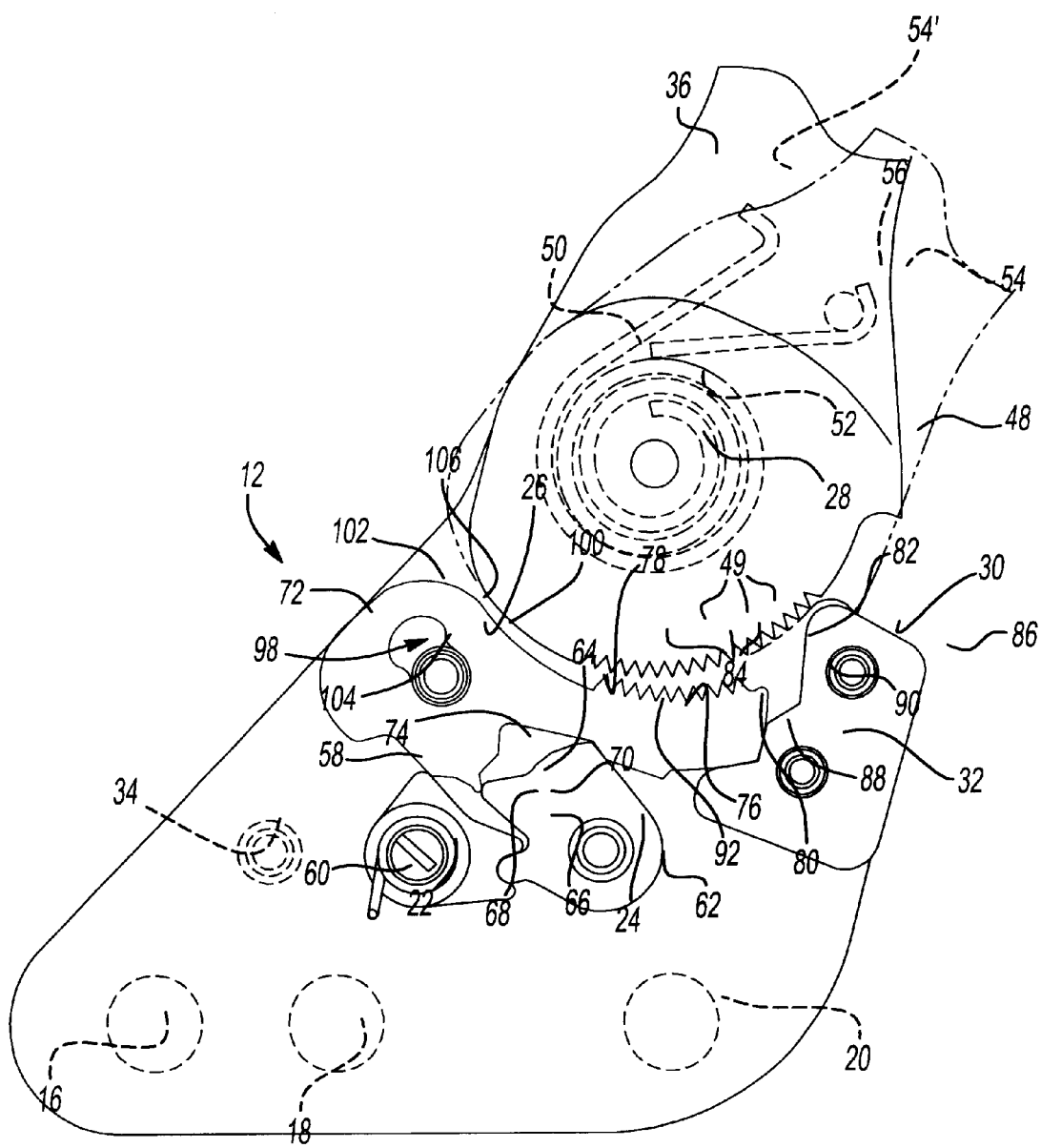
FIG. 3 is a second plan view illustrating the pawl, by virtue of the first and second cams, being actuated to a disengaged position relative to the latch gear.

With reference now to FIG. 1, a portion of a vehicle frame is illustrated at 10 and which incorporates the seat integrated latch mechanism according to the present invention. The frame 10 includes a lower support bracket, generally illustrated at 12. As best illustrated in FIG. 1, the support bracket 12 includes dual plates 9 and 11 which are separated by one or more spacer elements 13, however it is understood that a suitable support bracket can be configured in other shapes without departing from the scope of the invention. The support bracket 12 is further defined by an extending flange edge 14 and includes pluralities of apertures formed therethrough. These include a first plurality of apertures, each defined by inner annular extending edges 16, 18 and 20 and which are configured to receive mounting fasteners (not illustrated) for securing the bracket 12 to both a floor of the vehicle as well as the conventional seat bottom of the vehicle seat.

An additional plurality of apertures are defined within the lower support bracket 12 at selected locations by projecting collared portions 22, 24, 26, 28, 30, 32 and 34 (again with inwardly facing annular edges). The purpose for the arrangement and placement of the additional plurality of apertures will be further described below.

An upwardly extending arm 36 is hingedly connected to the support bracket 12 and by virtue of an annular collar 38 defined at the lower end of the arm 36. The arm 36 is reinforced by first 40 and second 42 projecting and axially extending edges which terminate in a conjoined edge 44 projecting around the hinged connection. The extending arm 36 further includes a thickened and stepped portion 46 at the hinged connection and which, upon experiencing an inertial load, engages against the extending flange edge 14 of the support bracket 12 to prevent the arm 36 from bending.

Figure 4:
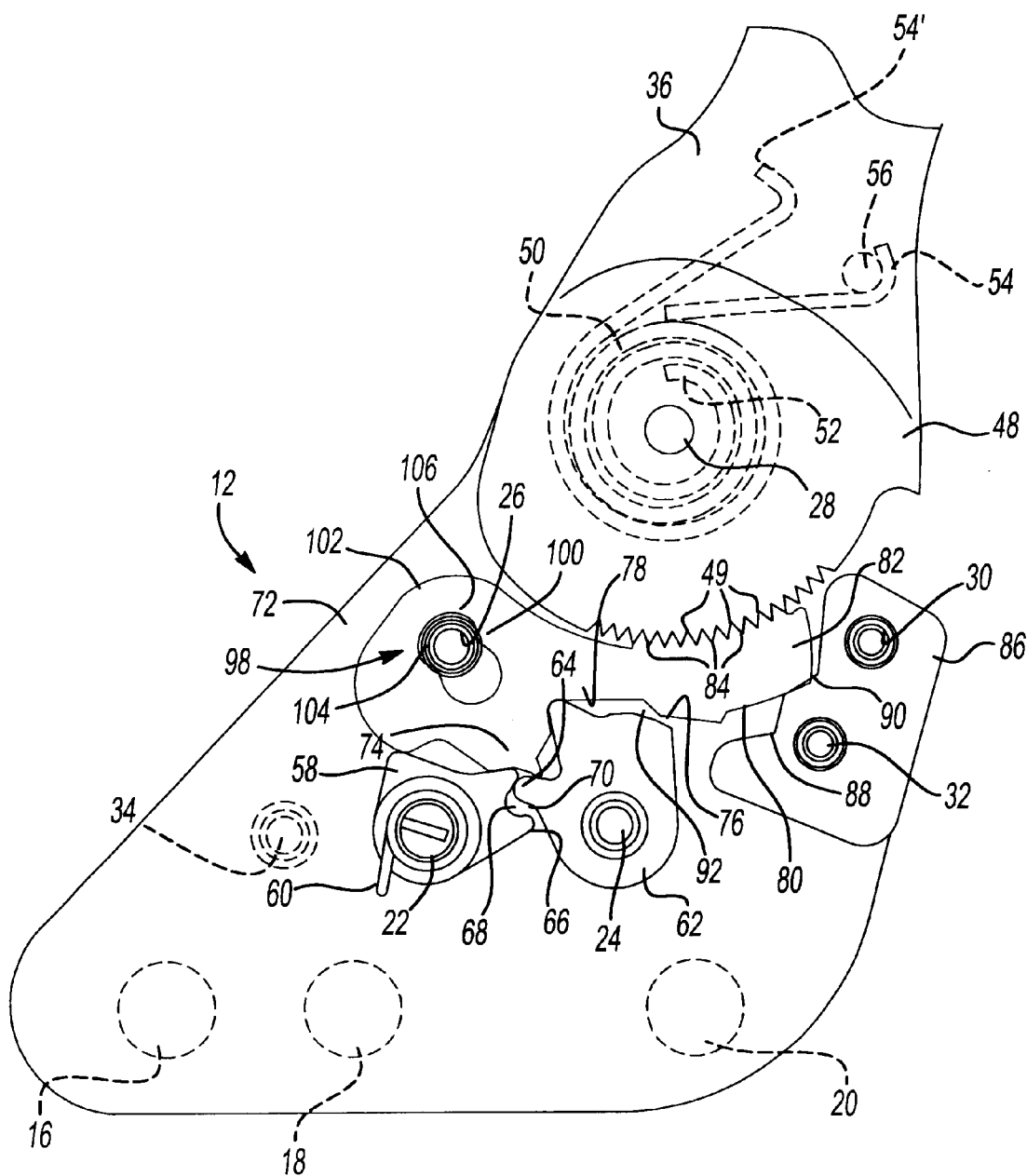
FIG. 4 is third plan view illustrating the pawl in a laterally shifted position in response to a deformed and inertial loaded position and in which an extending end configuration of the pawl is seated upon a stepped shoulder support surface of the wedge block and so that an arrayed plurality teeth of the pawl are forcibly inter-engaged with an arrayed plurality of teeth of the latch gear to immovably restrain the arm.

Referring to FIGS. 2, 3 and 4 in succession, a latch gear 48 is illustrated which is secured to the arm 36 at the hinged connection and such as by pins, mounting fasteners or the like (not shown). The latch gear 48 include a substantially rounded exterior surface and which is defined, over a selected range, by a selected plurality of teeth 49. A coil spring, illustrated in phantom at 50, spring biases the latch gear 48 in a given rotational direction, such as a counterclockwise direction as evidenced in the drawing figures. The spring 50 includes a coiled end 52 engaging around the collared portion 28 associated with the selected aperture in the support bracket 12. The spring 50 further includes an extending leg 54 which engages a pin 56 extending from the arm 36 (seat back) and which, upon actuation of the latch mechanism as will be subsequently described, causes the leg 54 of the spring 50 and the seat back to pivot such as in a forward direction and as is referenced by rotated spring end 54'.

A first cam 58 is mounted over the collared portion 22 (such as again through the use of a conventional pin or the like), such collared portion corresponding to the associated aperture in the support bracket 12. The first cam 58 is further spring biased (by coil spring 60) in a counterclockwise direction and, in the preferred embodiment, the cam 58 is capable of being rotatably actuated by a lever (not illustrated) projecting from the side of the seat bottom.

A second cam 62 is mounted over the collared portion 24 in similar fashion as the first cam 58 and so that the first cam 58 and second cam 62 rotatably engage one another. This is accomplished by an exterior configuration of the first cam 58 being defined, in part, by first and second projections 64 and 66, between which is defined a substantially "U" shaped recess 68. Seated within the recess 68 is a projecting finger 70 of the second cam 62 so that, upon actuation/rotation of the first cam 58 in a clockwise manner illustrated between FIGS. 2 and 3, the second cam 62 is engageably rotated in a reverse and counterclockwise fashion.

A pawl 72 is provided as a substantially elongated member and which is mounted over the collared portion 26 of the associated aperture in the support bracket 12 in a likewise pivotally secured fashion. The elongate extending body of the pawl 72 includes a substantially rounded end at which it is rotatably engaged to the collared portion 26. Additional characteristics of the pawl 72 include uniquely configured projections 74 and 76 and alternating recess 78 defined in a downwardly facing surface and which precedes a substantially arcuate extending surface 80 terminating in an extending end configuration 82. Defined in an opposite and upwardly facing surface of the pawl 72, and along a selected range, is a plurality of teeth 84.

A wedge block 86 is fixedly secured to the support bracket 12 at the location defined by the collared projections 30 and 32 associated with the corresponding recesses in the bracket 12. Again, mounting pins or the like (not shown) may be employed to securely mount the wedge block 86 in place. The wedge block 86 is arranged in an opposing fashion relative to the extending end configuration 82 of the pawl 72 and the wedge block 86 includes a first shoulder support surface 88 and a second shoulder support surface 90 stepped upwardly from the first support surface 88.

Referring to FIG. 2, the configuration of the downwardly facing surface of the pawl 72 (and in particular the projection 78) is illustrated seated upon a specified location 92 of the second cam 62 and so that the plurality of upwardly facing teeth 84 are maintained in the specified and interengaging relationship with the opposing plurality of teeth 49 associated with the latch gear 48. Upon actuating the first 58 and second 62 cams in the manner illustrated by FIG. 3, the specified location 92 of the second cam 62 is rotated in the counterclockwise direction, thus unseating from the projection 76 in the downwardly facing surface of the pawl 72 and reseating within the recess 78 disposed between the projections 74 and 76. This causes the upwardly facing teeth 84 of the pawl 72 to drop out of engagement with the teeth 49 of the latch gear 48. At this stage, the underside of the pawl 72 is supported in its disengaged position (again FIG. 3) and in abutting fashion against further specified projecting locations 94 and 96 associated with the first 58 and second 62 cams, respectively. Concurrently, the arcuately extending surface 80 (and proximate the end configuration 82 of the pawl 72) is seated in abutting fashion upon the first 88 of the stepped shoulders associated with the wedge block 86.

Referring now to FIG. 4, an explanation will now be provided as to how, upon the occurrence of an inertial load (or which is otherwise termed a "crash load") the latch mechanism of the present invention provides a securely seating or wedging support of the teeth 84 of the pawl 72 against the teeth 49 of the opposing latch gear 48. Specifically, an elongated interior channel 98 is defined within the pawl 72 at the location through which extends the collared projection 26. The channel includes a first substantially circular shaped section 100 and a second substantially circular shaped section 102 communicating with the first circular section 100 by a narrowed boundary disposed therebetween and which is defined by edges 104 and 106.

A fixed pin (corresponding again to the collared portion 26) projects from the support bracket 12 and through the first section 100 of the interior channel 98 and as is illustrated in the normal latched and disengaged positions of FIGS. 2 and 3. Upon absorbing the inertial or "crash" load of FIG. 4, the pin/collared portion 24 radially shifts across said narrowed boundary (edges 104 and 106) to the second section 102. At this point, referencing again FIG. 4, the arcuate extending surface 80 is seated upon the second 90 of the stepped shoulders of the wedge block. Concurrently, an additional projection 108 of the second cam 62 abuttingly engages seats against a recessed underside location of the pawl 72 (located between the projection 74 and recess 78). The first cam 58 also includes another projecting edge location 110 (illustrated in FIG. 4) and which supports against a further underside location 112 of the pawl 72 so that the pawl 72 is supported in its deformed/crash position by all of the first cam 58, second cam 62 and wedge block 62.

Having described our invention, it is apparent that it discloses an integrated and reclining latch mechanism for a seat assembly which is a novel improvement over the prior art and further which provides an increased degree of holding support between the pawl and latch gear of the seat back. Additional preferred embodiments of the present latch mechanism will become apparent to those skilled in the art and without deviating from the scope of the appended claims. In particular, it is envisioned that the latch mechanism could be reconfigured to operate with a single cam element in place of the two cams disclosed in the preferred embodiment. Further, the shaping of the pawl, wedge block and range and positioning of the interengaging teeth can also be modified within the scope of the invention.

We claim:

1. A latch assembly for use with a vehicle seat, said latch assembly comprising:
   a frame including a lower support bracket and an upwardly extending arm hingedly connected to said support bracket, said arm being pivotally associated relative to said support bracket and defining part of a seat back of the vehicle seat;
   a latch gear secured to said arm at said hinged connection, an exterior facing surface of said latch gear being defined, in part, by a first plurality of teeth;
   a first cam pivotally secured to said support bracket at a first lower-most location;
   a second cam pivotally secured to said support bracket at a second location proximate said first cam, said second cam being engageable by said first cam, said first and second cams being configured so that, upon rotation of said first cam in a given direction, said second cam rotates in an opposite direction;
   a pawl pivotally secured to said support bracket at a third location located generally above said first and second cams and being engageable by at least one of said first and second cams, said pawl including a second plurality of teeth arrayed in opposing fashion to said first plurality of teeth of said latch gear, said pawl further including an extending end configuration;
   a wedge block fixedly secured to said support bracket at a fourth and generally rearward location relative to said extending end configuration of said pawl, said wedge block including a first shoulder support surface and a second shoulder support surface, said extending end configuration of said pawl engaging said first support surface upon being rotated from a first latched position to a second disengaged position, said extending end configuration engaging said second shoulder support surface upon lateral shifting of said pawl; and
   means for shifting said pawl in a lateral direction and in response to an inertial load and so that said extending end configuration engages upon said second shoulder support surface and so that said second plurality of teeth of said pawl are forcibly engaged against said first plurality of teeth of said latch gear.

2. The latch assembly as described in claim 1, further comprising said first cam being spring biased in a selected rotational direction.

3. The latch assembly as described in claim 2, further comprising said latch gear being spring biased in a selected rotational direction.

4. The latch assembly as described in claim 1, said means for shifting said pawl further comprising an elongated interior channel defined within said pawl, said channel including a first substantially circular shaped section and a second substantially circular shaped section communicating with said first circular section by a narrowed boundary disposed therebetween, a fixed pin projecting from said support bracket and through a first selected section of said interior channel, said pin radially shifting across said narrowed boundary to a further selected section upon occurrence of said inertial load.

5. The latch assembly as described in claim 1, an exterior configuration of said first cam including a substantially "U" shaped recess, a corresponding exterior configuration of said second cam including a projecting finger seatingly received within said "U" shaped recess.

6. The latch assembly as described in claim 5, said second cam further comprising an additional projection engaging an underside surface of said pawl.

7. The latch assembly as described in claim 6, said first cam engaging said pawl upon shifting in said lateral direction.

8. The latch assembly as described in claim 1, further comprising a plurality of apertures formed through said support bracket, a plurality of mounting pins extending through said apertures and securing said first cam, said second cam, said pawl and said wedge block at said associated first, second, third and fourth locations.

9. The latch assembly as described in claim 1, said upwardly extending arm further comprising reinforcement portions located proximate said hinged connection with said support bracket, said reinforcement portions, upon experiencing said inertial load, engaging against an extending flange edge of said support bracket to prevent said arm from bending.

10. The latch assembly as described in claim 9, said reinforcement portions further comprising first and second projecting and axially extending edges of said arm which terminate in a conjoined edge projecting around said hinged connection.

11. The latch assembly as described in claim 1, said extending end configuration of said pawl further comprising an upwardly and arcuately extending surface.

12. A latch assembly for use with a vehicle seat, the seat having a frame with a lower support bracket and an upwardly extending arm hingedly connected to said support bracket and defining part of a seat back of the vehicle seat; said latch assembly comprising:

a latch gear secured to said arm at said hinged connection, said latch gear including a first plurality of teeth;

at least one cam pivotally secured to said support bracket;

a pawl pivotally secured to said support bracket and engageable by said cam, said pawl including a second plurality of teeth arrayed in opposing and engaging fashion with said first plurality of teeth of said latch gear, said pawl disengaging from said latch gear in response to said cam being rotated in a selected direction, said pawl further including an extending end configuration;

a wedge block fixedly secured to said support bracket at a location rearwardly of said pawl, said wedge block including a first shoulder support surface and a second shoulder support surface, said extending end configuration of said pawl engaging said first support surface upon being rotated from a first latched position to a second disengaged position, said extending end configuration engaging said second shoulder support surface upon lateral shifting of said pawl; and said pawl shifting in a lateral direction in response to an inertial load so that said extending end configuration engages upon said second shoulder support surface and said second plurality of teeth of said pawl are forcibly engaged against said first plurality of teeth of said latch gear.

13. A latch assembly for use with a vehicle seat, said latch assembly comprising:

a frame including a lower support bracket and an upwardly extending arm hingedly connected to said support bracket, said arm being pivotally associated relative to said support bracket and defining part of a seat back of the vehicle seat;

a latch gear secured to said arm at said hinged connection, an exterior facing surface of said latch gear being defined, in part, by a first plurality of teeth;

a first cam pivotally secured to said support bracket at a first location;

a second cam pivotally secured to said support bracket at a second location and being engageable by said first cam, said first and second cams being configured so that, upon rotation of said first cam in a given direction, said second cam rotates in an opposite direction;

a pawl pivotally secured to said support bracket at a third location and being engageable by at least one of said first and second cams, said pawl including a second plurality of teeth arrayed in opposing fashion to said first plurality of teeth of said latch gear, said pawl further including an extending end configuration;

a wedge block fixedly secured to said support bracket at a fourth location, said wedge block including at least one shoulder support surface; and means for shifting said pawl in a lateral direction and in response to an inertial load and so that said extending end configuration engages upon said at least one shoulder support surface and so that said second plurality of teeth of said pawl are forcibly engaged against said first plurality of teeth of said latch gear, said means for shifting said pawl further comprising an elongated interior channel defined within said pawl, said channel including a first substantially circular shaped section and a second substantially circular shaped section communicating with said first circular section by a narrowed boundary disposed therebetween, a fixed pin projecting from said support bracket and through a first selected section of said interior channel, said pin radially shifting across said narrowed boundary to a further selected section upon occurrence of said inertial load.

* * * * *